United States Patent
Tseng (10) Patent No.: US 6,813,821 B1
(45) Date of Patent: Nov. 9, 2004

(54) MANUFACTURING METHOD FOR A GOLF CLUB HEAD

(75) Inventor: Wen-Cheng Tseng, 12F-2, No. 275, Sec. 2, Ta-Hsing W. Rd., Taoyuan (TW)

(73) Assignees: Wen-Cheng Tseng, Taoyuan (TW); Kung-Wen Lee, Kaohsiung (TW)

( * ) Notice: Subject to any disclaimer, the term of this patent is extended or adjusted under 35 U.S.C. 154(b) by 0 days.

(21) Appl. No.: 10/640,781

(22) Filed: Aug. 14, 2003

(51) Int. Cl.⁷ .............................................. B23P 17/00
(52) U.S. Cl. ......................... 29/527.6; 29/447; 29/458; 29/464; 29/527.3; 473/305
(58) Field of Search .......................... 29/447, 458, 464, 29/527.3, 527.6; 473/282, 305, 330

(56) References Cited

U.S. PATENT DOCUMENTS

| | | | | |
|---|---|---|---|---|
| 4,123,060 A | * | 10/1978 | Sterling | 473/343 |
| 4,750,537 A | * | 6/1988 | Green | 144/363 |
| 5,232,224 A | * | 8/1993 | Zeider | 473/345 |
| 5,527,034 A | * | 6/1996 | Ashcraft et al. | 473/330 |
| 5,595,548 A | * | 1/1997 | Beck | 473/324 |
| 5,709,614 A | * | 1/1998 | Horiba | 473/305 |
| 5,888,148 A | * | 3/1999 | Allen | 473/290 |
| 6,088,903 A | * | 7/2000 | Matsuo | 29/558 |
| 6,305,063 B1 | * | 10/2001 | Ashcraft et al. | 29/418 |
| 6,739,376 B1 | * | 5/2004 | Cheng et al. | 164/35 |

* cited by examiner

Primary Examiner—Eric Compton
(74) Attorney, Agent, or Firm—Jackson Walker LLP (57) ABSTRACT

A method to manufacture a golf club head includes the steps of casting a head shell and welding a face plate on the head shell, polishing the golf club head, making transversal channels on the face plate, clamping the head on a vise, drilling, discharging sweeps and waste liquid from the golf club head, installing a shaft tube, polishing welded portions around the shaft tube, removing ears, and painting.

6 Claims, 12 Drawing Sheets

FIG.12

MANUFACTURING METHOD FOR A GOLF CLUB HEAD

BACKGROUND OF THE INVENTION

1. Field of the Invention

The present invention relates to a manufacturing method for a golf club head, and more particularly to a method to make a golf club head with a precise lie angle and face angle.

2. Description of Related Art

A set of golf clubs generally includes a plurality of golf clubs with various lengths, lie angles, and face angles. The lie angle of the golf club is an included angle between a shaft and the ground, and the face angle is an inclination of a face plate from a heel to a toe.

In a conventional method of manufacture, each specific club head having a certain lie angle and a face angle typically requires a unique set of costly dies. Thus, many dies are needed to make even a relatively small range of different club heads.

Therefore, the invention provides a method for manufacturing the golf club head to mitigate and/or obviate the aforementioned problems.

SUMMARY OF THE INVENTION

The main objective of the invention is to provide a method which enables manufacture of a golf club head with a precise lie angle and face angle and a low cost.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
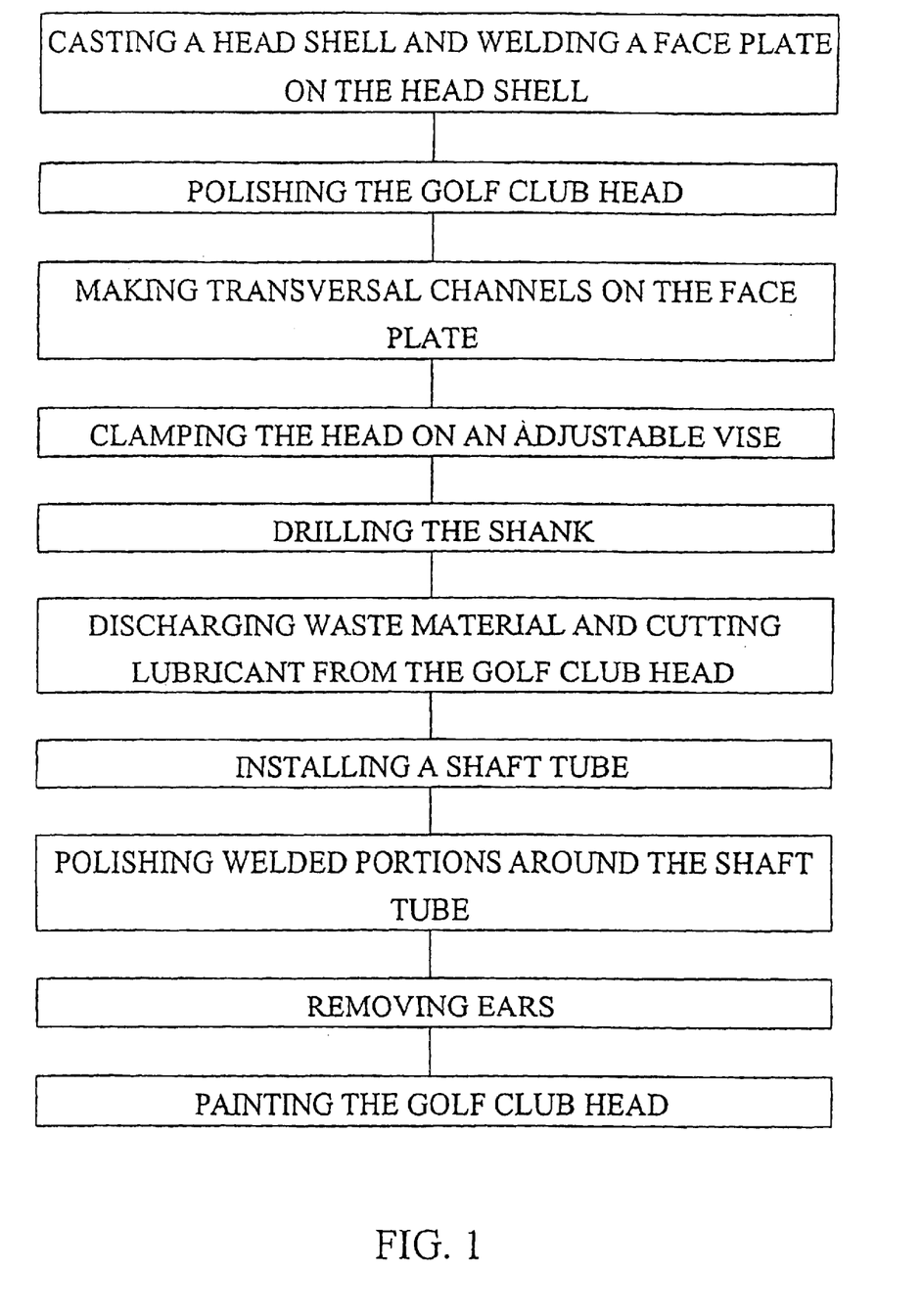
FIG. 1 is a block diagram of a manufacturing process for the golf club head in accordance with the present invention.

With reference to FIG. 1, according to the present invention, a method to manufacture a golf club head includes the steps of casting a head shell and welding a face plate on the head shell, polishing the golf club head, making transversal channels on the face plate, clamping the head on a vise, drilling, discharging waste material and cutting lubricant from the golf club head, installing a shaft tube, polishing welded portions around the shaft tube, removing ears, and painting.

1. Casting a Head Shell and Welding a Face Plate on the Head Shell

Figure 2:
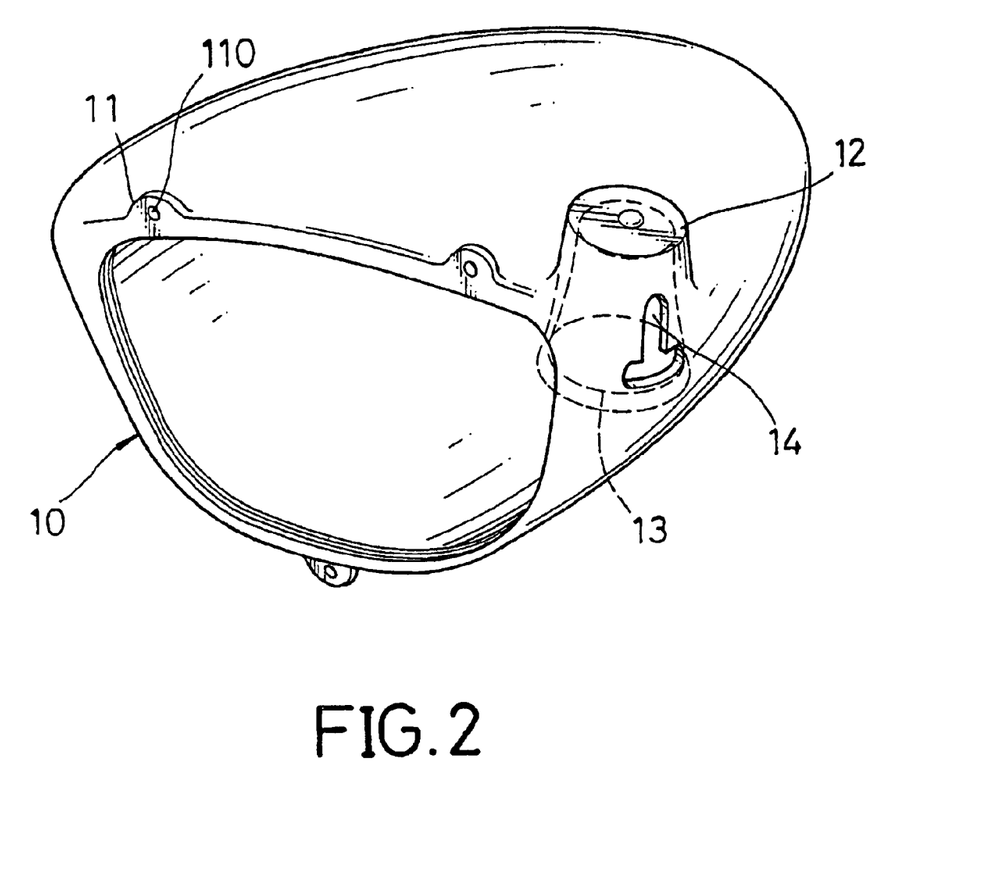
FIG. 2 is a perspective view of a head shell of a golf club head in accordance with the present invention.
Figure 3:
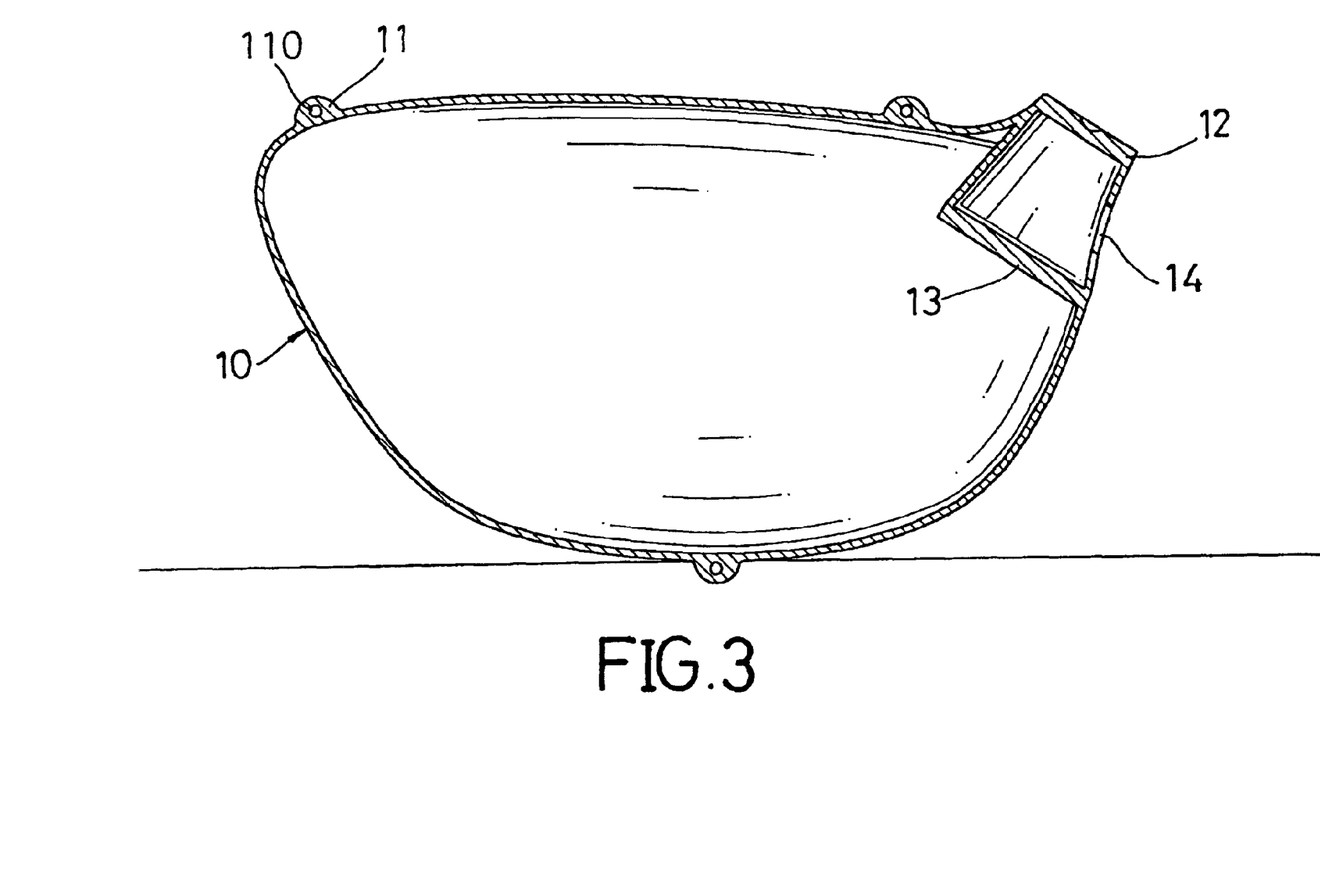
FIG. 3 is a cross sectional side plan view of the head shell in FIG. 2.
Figure 6:
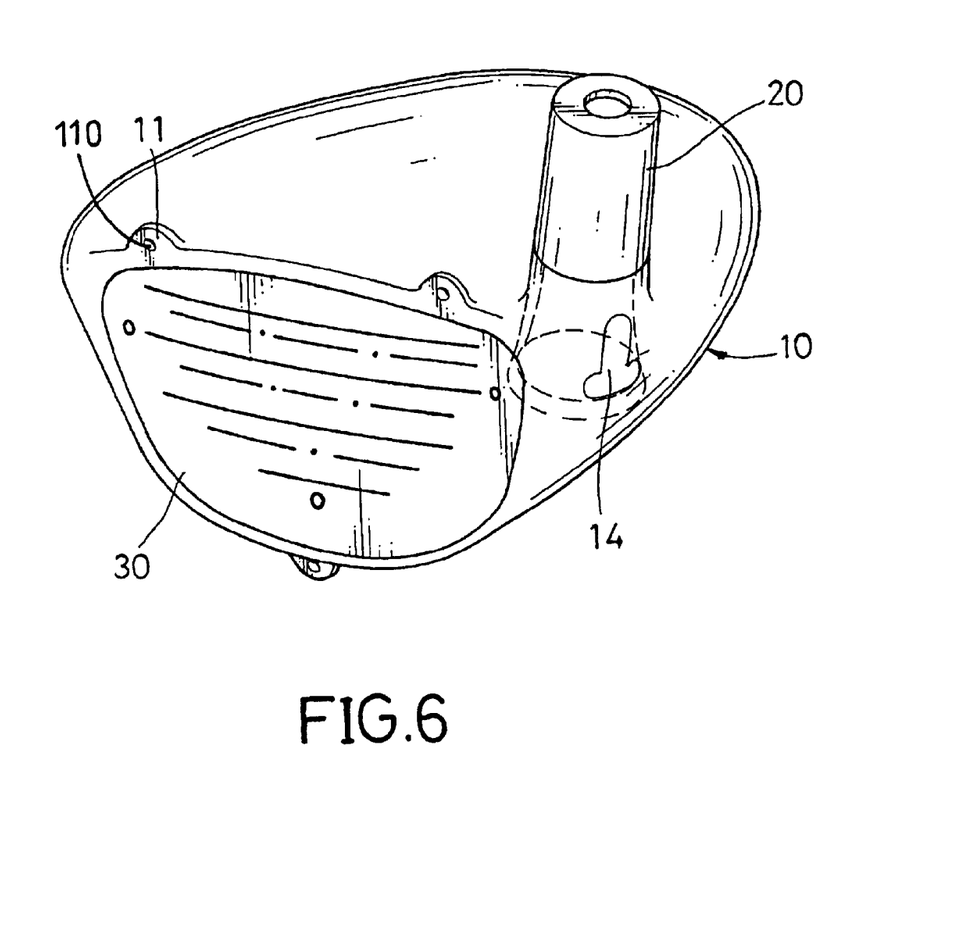
FIG. 6 is a perspective view of the golf club head assembled with the shaft tube and the face plate.

With reference to FIGS. 2 and 3, the golf club head has a hollow head shell (10) which has a sole (not numbered), a crown (not numbered), a toe (not numbered), a heel (not numbered), a rear wall (not numbered), a hollow shank (not numbered) and an open front face (not numbered) integrally formed by precision casting. The open front face has an inner peripheral rim (not numbered), and an outer peripheral rim (not numbered), and multiple ears (11) each with an aperture (110) are formed around the outer peripheral rim. The shank is formed at the heel of the head shell (10) and has an upper seat (12) protruded from the head shell (10) and a lower seat (13) extending into the head shell (10). A welding opening (14) is defined through the head shell (10) between the upper seat (12) and the lower seat (13). With reference to FIG. 6, a face plate (30) is welded to the inner peripheral rim of the open front face.

2. Polishing the Golf Club Head

The golf club head, including the head shell (10), the face plate (30) and welded lines (not numbered) between them, is polished.

3. Making Transversal Channels on the Face Plate

Transversal channels (not numbered) are formed on the face plate (30), and the apertures (110) are precisely machined.

4. Clamping the Head on an Adjustable Vise

With reference to FIGS. 3 and 6, the golf club head is positioned on an adjustable vise (not shown) by clamping the ears (11) and the face plate (30). The vise can adjust the golf club head to align the shank with a drill (as shown with FIG. 4) at a desired angle.

5. Drilling

Figure 4:
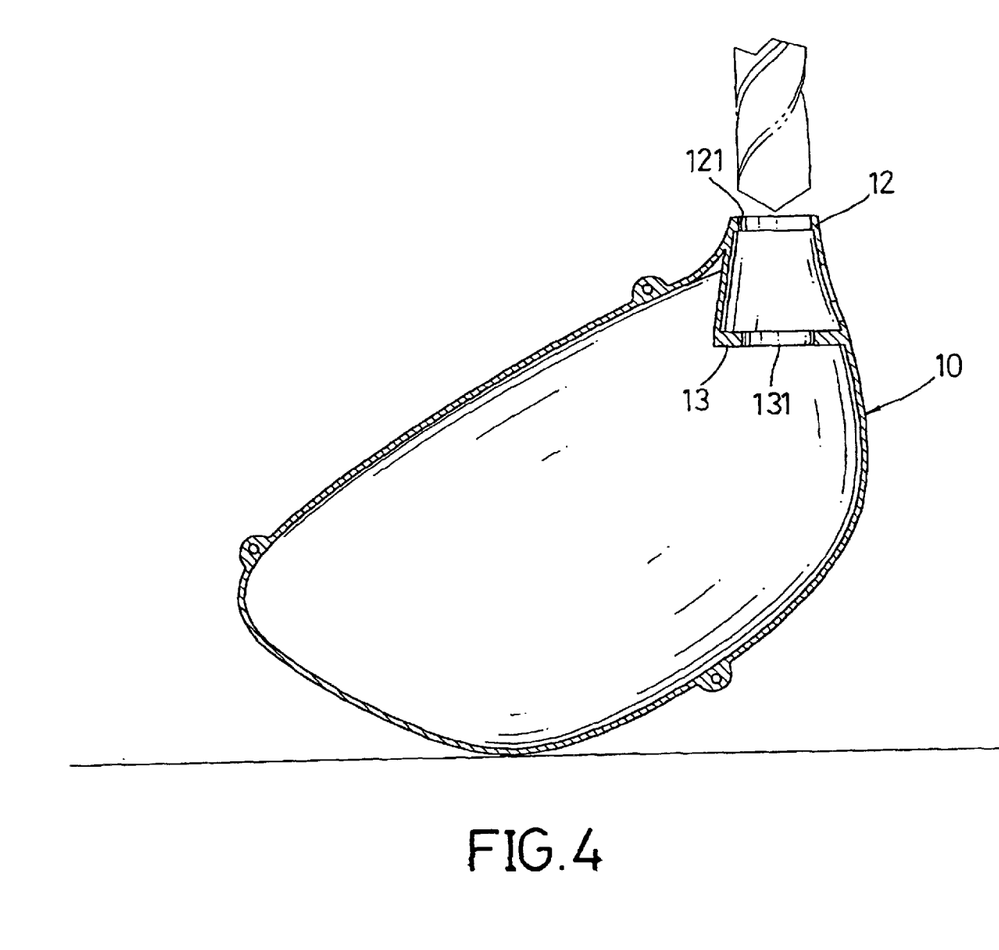
FIG. 4 is a cross sectional side plan view of a shank being drilled.

With reference to FIG. 4, when the golf club head is positioned at the desired angle, the shank is drilled by the drill (not numbered) to define an upper hole (121) in the upper seat (12) and a lower hole (131) in the lower seat (13).

6. Discharging Waste Material and Cutting Lubricant From the Golf Club Head.

By using a high-pressure air supply from an air compressor (not shown), waste material and cutting liquid in the golf club head are discharged from the upper hole (121) and the welding opening (14).

7. Installing a Shaft Tube.

Figure 5:
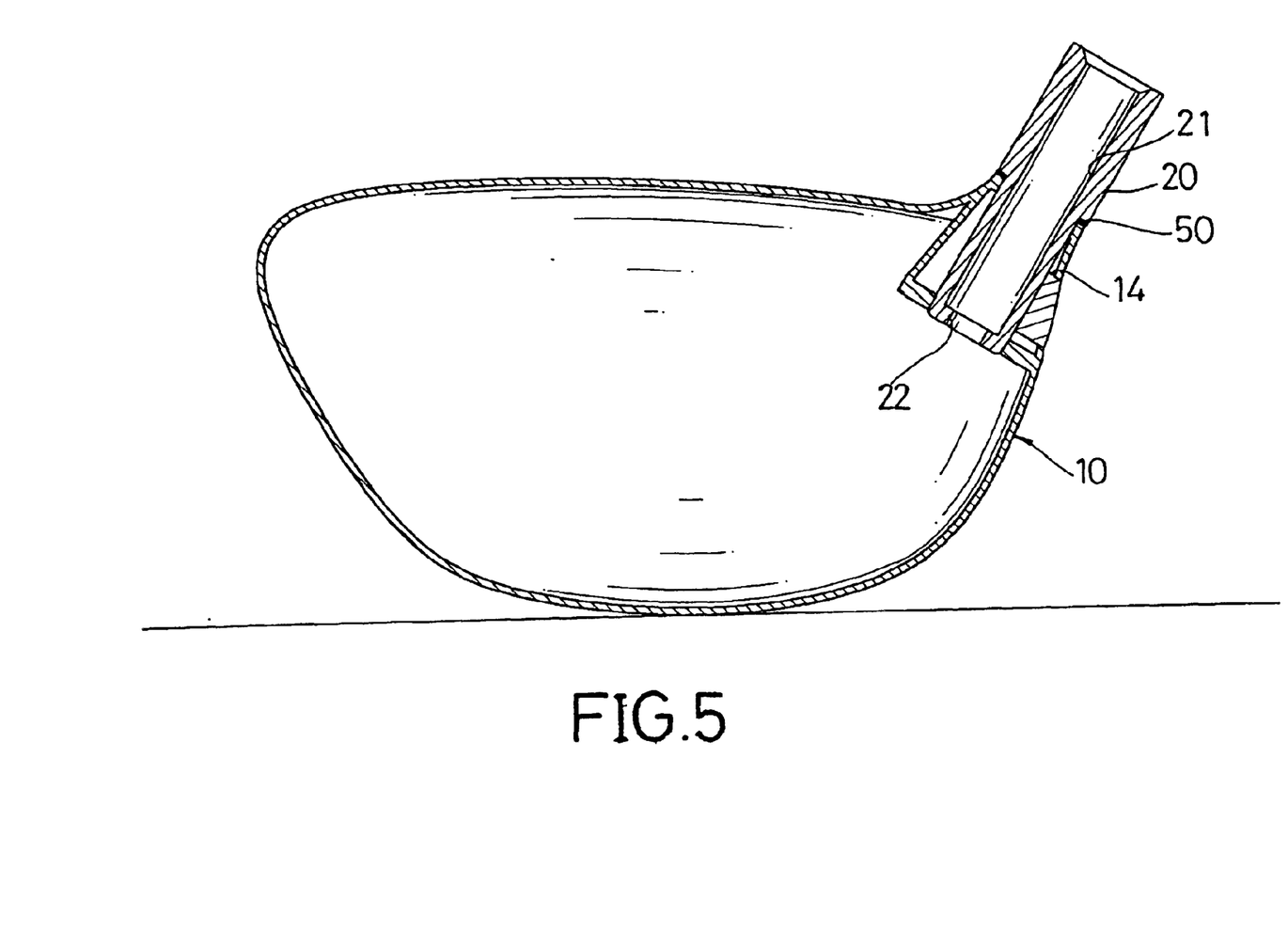
FIG. 5 is a cross sectional side plan view of a shaft tube being secured in the shank.

With reference to FIG. 5, a shaft tube (20) is inserted in the upper hole (121) and the lower hole (131) and welded at the welding opening (14) and an interface (50) between the upper seat (12) and the shaft tube (20). The shaft tube (20) has a passage (21) defined therethrough and an opening (22) defined at a lower end thereof.

The shaft tube (20) also can be installed in the shank by means other than welding opening (14). For example, the shaft tube (20) has an outer diameter slightly larger than an inner diameter of the upper hole (121) and the lower hole (131). Before the shaft tube (20) is inserted in the upper and lower holes (121, 131), the shaft tube (20) is cooled to under −30° C. to shrink its outer diameter, so the shaft tube (20) is tightly fastened in the shank at room temperature. Then, the shaft tube (20) is welded to the shank at the interface (50) between the shaft tube (20) and the upper seat (12).

In another manner, the lower seat (13) has an internal thread (not shown) formed in the lower hole (131), and the shaft tube (20) has an external thread (not shown) formed at the lower end and engaged with the internal thread of the lower hole (131). Then, the shaft tube (20) is welded to the shank at the interface (50) between the shaft tube (20) and the upper seat (12).

In a further manner, the upper seat (12) and the lower seat (13) have internal threads (not shown) respectively formed in the upper hole (121) and the lower hole (131), and the shaft tube (20) has external threads (not shown) formed at an outer periphery thereof and bond spread on the threaded portions. The shaft tube (20) is inserted through the upper seat (12) and the lower seat (13) by the external threads respectively engaged with the internal threads, and the shaft tube (20) is accordingly secured.

8. Polishing Welded Portions Around the Shaft Tube

With reference to FIG. 5, welded portions around the welding opening (14) and the interface (50) are polished.

9. Removing Ears

With reference to FIG. 6, the ears (11) are removed from the head shell (10) and portions around the removed ears (11) are polished.

10. Painting

The golf club head is then painted.

Figure 7:
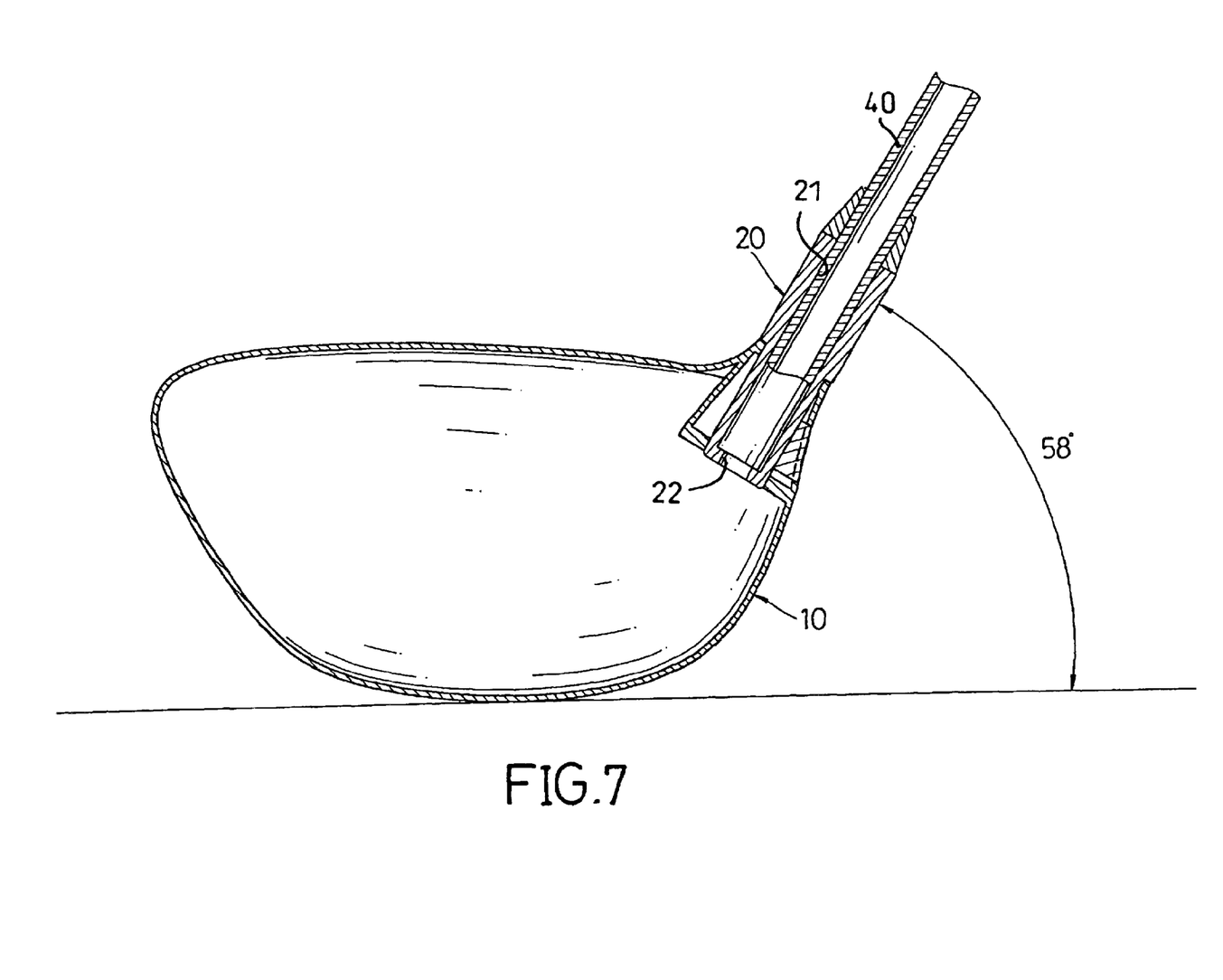
FIG. 7 is a cross sectional side plan view of a shaft being attached to the shaft tube with a lie angle of 58°.
Figure 8:
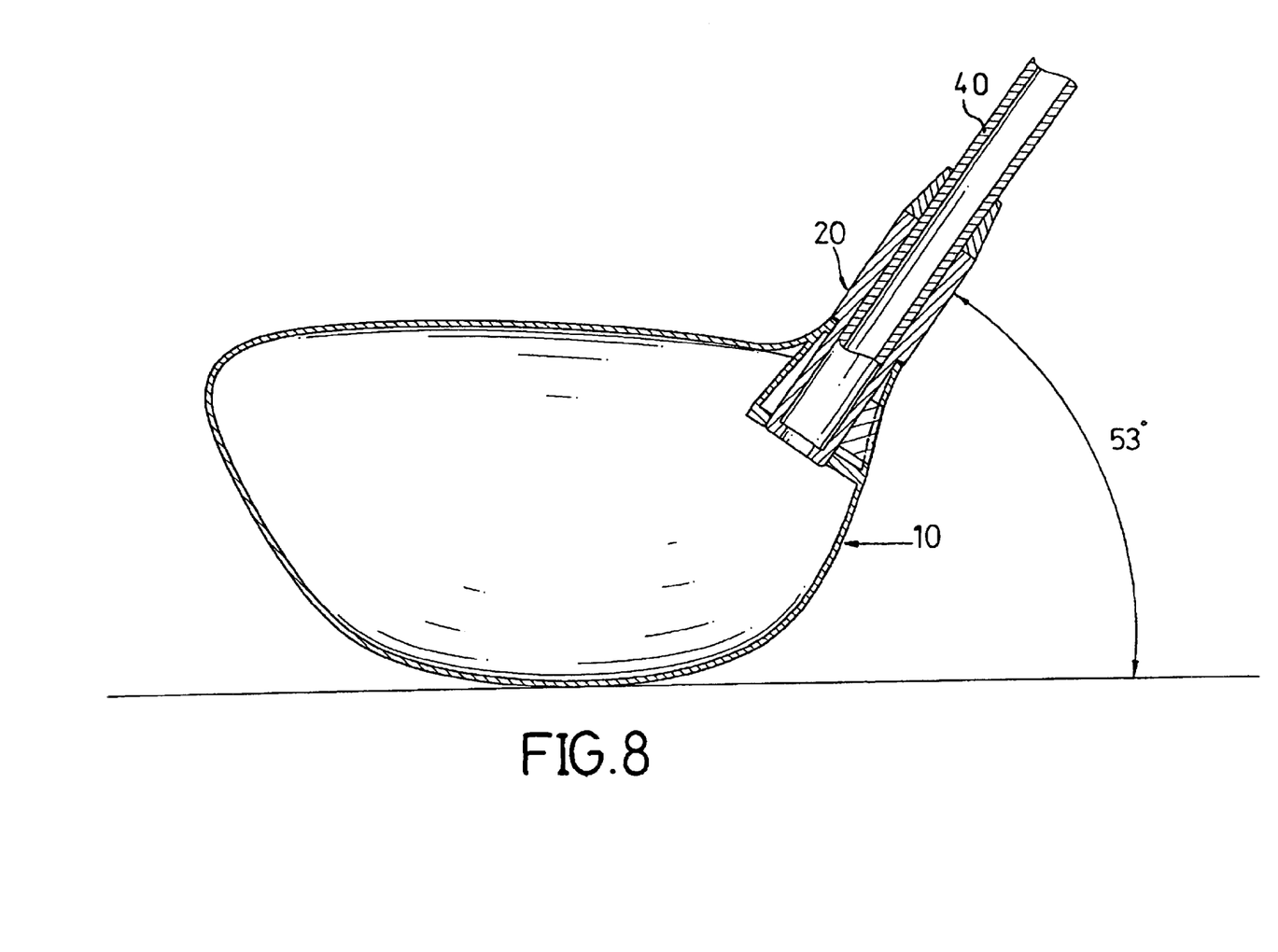
FIG. 8 is a cross sectional side plan view of the shaft being attached to the shaft tube with a lie angle of 53°.
Figure 9:
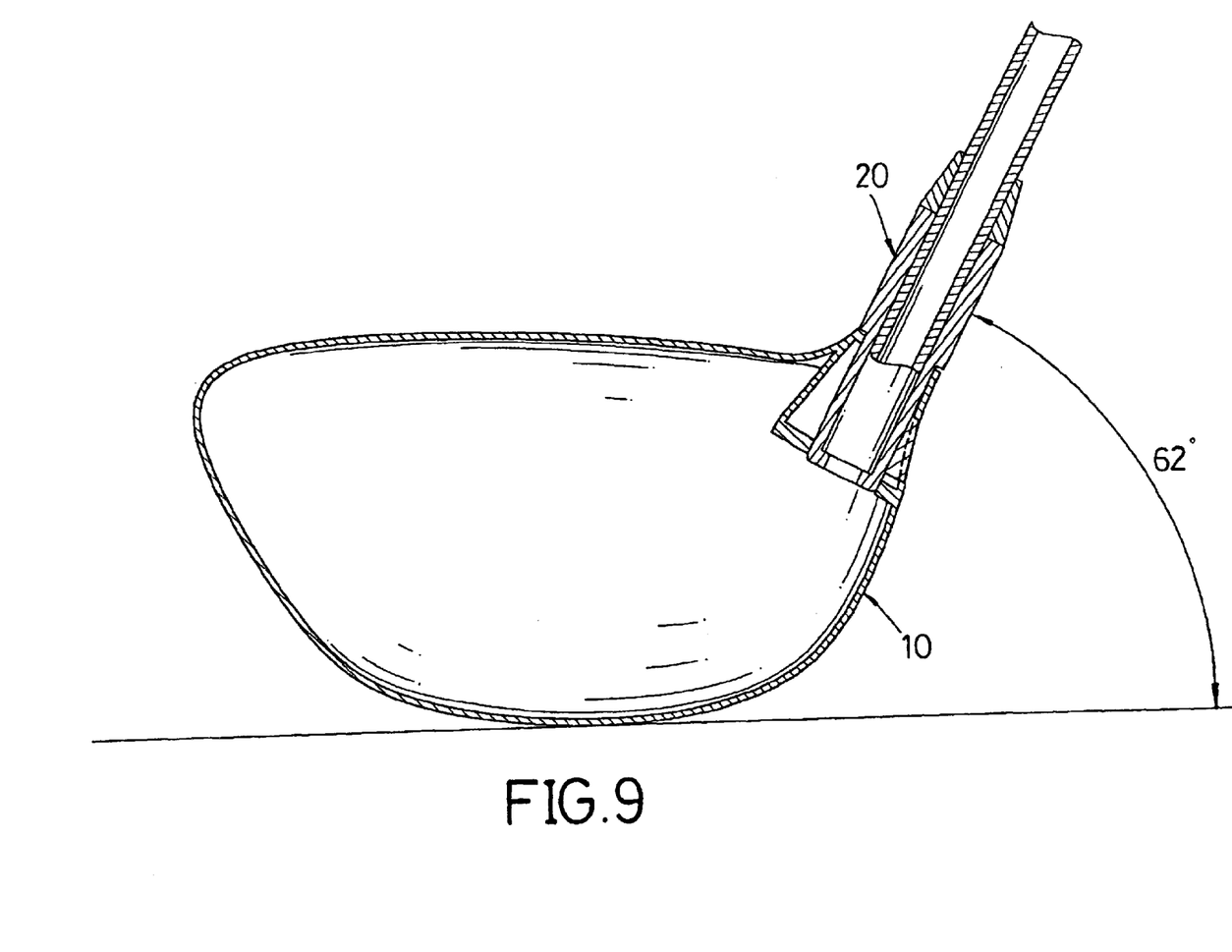
FIG. 9 is a cross sectional side plan view of a shaft being attached to the shaft tube with a lie angle of 62°.

With reference to FIG. 7, a golf club shaft (40) can be inserted in the shaft tube (20). Because the angles of the upper hole (121) and the lower hole (131) are precisely determined in the previous procedure, a lie angle of the shaft (40) is determined. In the golf club head shown in FIG. 7, the lie angle is 58°. By adjustment of the specific vise, the angle of the upper hole (121) and the lower hole (131) can be changed to provide varying lie angles for the golf club head. FIG. 8 illustrates the golf club with the lie angle of 53°, and FIG. 9 illustrates the golf club with the lie angle of 62°.

Figure 12:
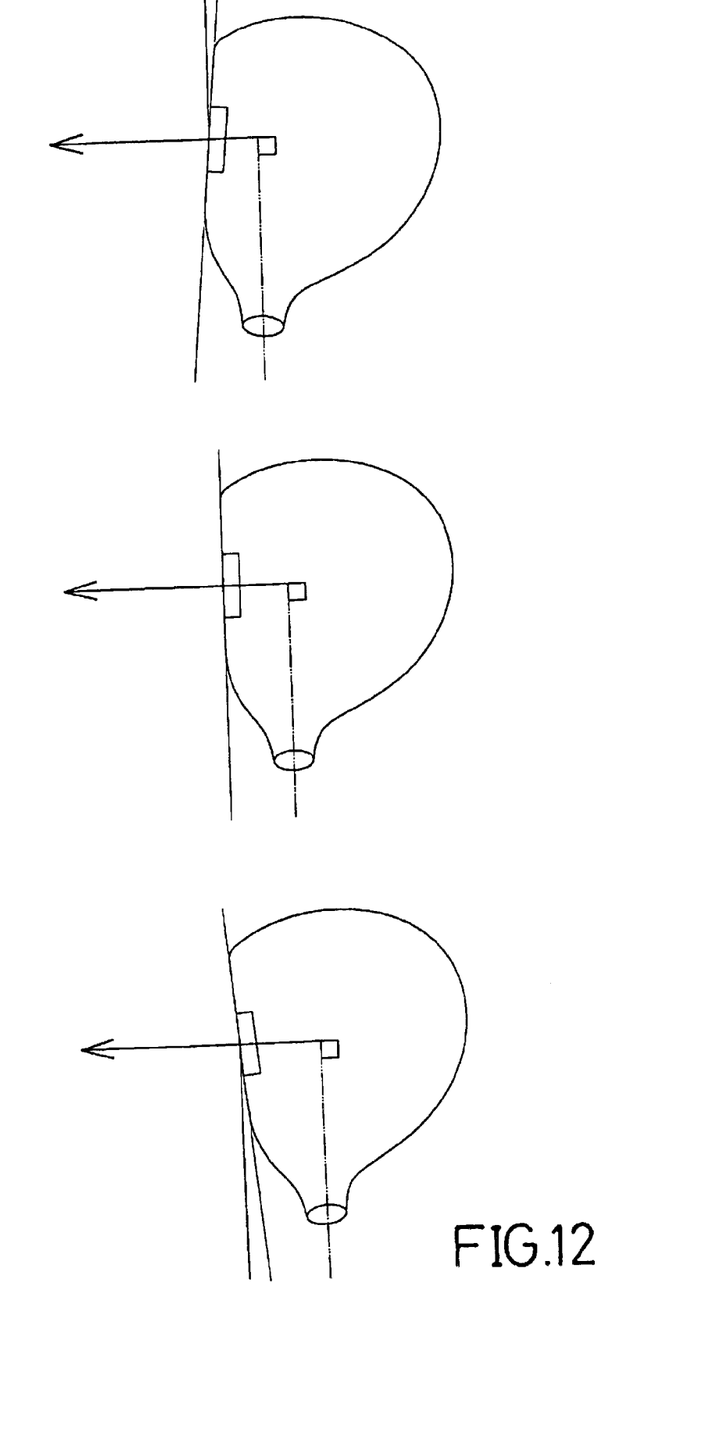
FIG. 12 is a schematic view of the golf club head made with varying face angles in accordance with the invention.

Furthermore, with reference to FIG. 12, a face angle of the face plate (30) also can be varied by changing an inclination angle of the open front face during casting of the head shell (10). Thus, the golf club head can be manufactured with various face angles and lie angles without using multiple costly dies.

The head (10) described above is the type of golf club head that the golf club shaft is only installed at the heel of the head shell and does not extend through the head shell. The method according to the invention is also applicable to the type of golf club head that the golf club shaft extends through the head shell as shown in FIGS. 10 and 11.

Figure 10:
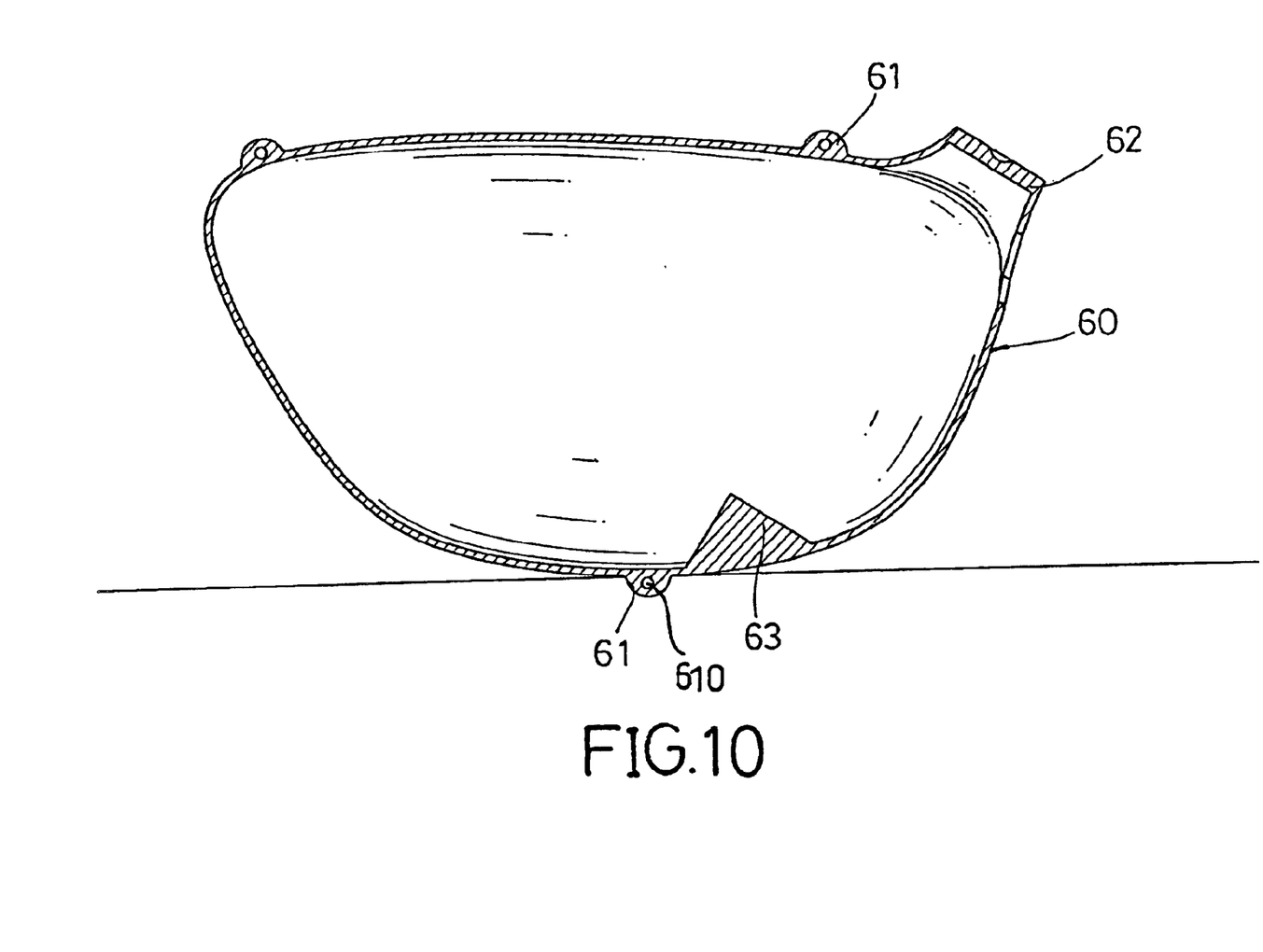
FIG. 10 is a cross sectional side plan view of another golf club head which can be made by the method in accordance with the invention.

With reference to FIG. 10, a head shell (60) has multiple ears (60) each with an aperture (61) formed around an open front face thereof. An upper seat (62) is formed at a heel of the head shell (60) and protruded from the head shell (60). A lower seat (63) is formed on a sole in the head shell (60) and aligned with the upper seat (62). The upper seat (62) and the lower seat (63) can be drilled with varying angles on the vise as described above, and a shaft (not shown) can be inserted through the upper seat (62), the lower seat (63) and the sole and welded in the head shell (60) with varying lie angles.

Figure 11:
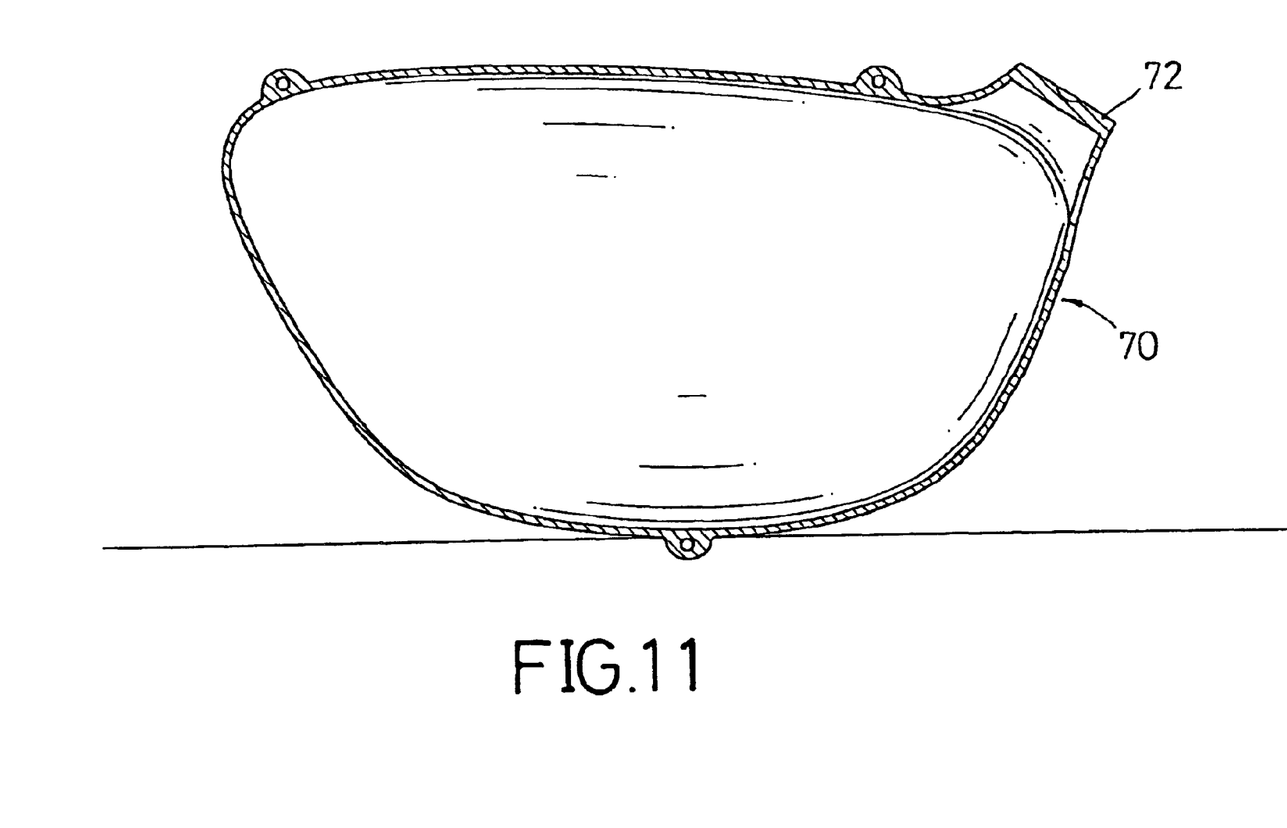
FIG. 11 is a cross sectional side plan view of a further golf club head which can be made by the method in accordance with the invention.

With reference to FIG. 11, a head shell (70) has only an upper seat (72) formed at a heel of the head shell (70). The upper seat (72) can be drilled at varying angles on the vise as described above, and a shaft (not shown) can be inserted through the upper seat (72) and the sole and welded in the head shell (70) with varying lie angles.

Therefore, according to the present invention, by using the method for manufacturing the golf club head, a series of golf club heads with various lie angles and face angles can be made without multiple dies, and each golf club head has a precise lie angle and face angle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a golf club head comprising the steps of:

casting a head shell and welding a face plate on the head shell, wherein the head shell has a sole, a crown, a toe, a heel, a rear wall, and an open front face integrally formed by precision casting, the open front face has an inner peripheral rim, and an outer peripheral rim, and multiple ears each with an aperture are formed around the outer peripheral rim, an upper seat is formed at the heel and protruded from the head shell, a lower seat is formed inside the head shell and aligned with the upper seat, and a face plate is welded to the inner peripheral rim of the open front face to construct the golf club head;

polishing the golf club head, wherein the welded portions between the head shell and the face plate are polished;

making transversal channels on the face plate, wherein transversal channels are formed on the face plate, and the apertures are precisely machined;

clamping the head on a vise, wherein the golf club head is positioned on an adjustable vise by clamping the ears and the face plate, and adjusted to align the upper seat and the lower seat with a drill at a desired angle;

drilling, wherein an upper hole is defined in the upper seat and a lower hole is defined in the lower seat;

discharging waste material and cutting lubricant from the golf club head;

installing a shaft tube, wherein a shaft tube is inserted in the upper hole and the lower hole and welded with the head shell;

polishing welded portions around the shaft tube;

removing ears, wherein the ears are removed from the head shell and portions around the removed ears are polished; and painting the golf club head.

2. The method for manufacturing a golf club head as claimed in claim 1, wherein the head shell has a welding opening defined between the upper seat and the lower seat, and the shaft tube is welded to the head shell at the welding opening and an interface between the upper seat and the shaft tube.

3. The method for manufacturing a golf club head as claimed in claim 1, wherein the shaft tube has an outer diameter slightly larger than an inner diameter of the upper hole and the lower hole, is cooled to under −30° C. to shrink its outer diameter and inserted through the upper hole and the lower hole to tightly fasten in the holes at room temperature, and is welded to the head shell at an interface between the shaft tube and the upper seat.

4. The method for manufacturing a golf club head as claimed in claim 1, wherein the lower seat has an internal thread formed in the lower hole, the shaft tube has an external thread formed at the lower end and engaged with the internal thread of the lower hole, and the shaft tube is welded at an interface between the shaft tube and the upper seat.

5. The method for manufacturing a golf club head as claimed in claim 1, wherein the upper seat and the lower seat have internal threads respectively formed in the upper hole and the lower hole, the shaft tube has external threads formed at an outer periphery thereof and bond spread on the threaded portions, and the shaft tube is inserted through the upper seat and the lower seat by the external threads respectively engaged with the internal threads, and is secured by the bond.

6. The method for manufacturing a golf club head as claimed in claim 1, wherein the lower seat is formed on a sole in the head shell.

\* \* \* \* \*